April 28, 1931. C. ADLER, JR 1,803,288
AUTOMATIC SPEED CONTROL MECHANISM FOR AUTOMOBILES
Filed July 23, 1926 3 Sheets-Sheet 1
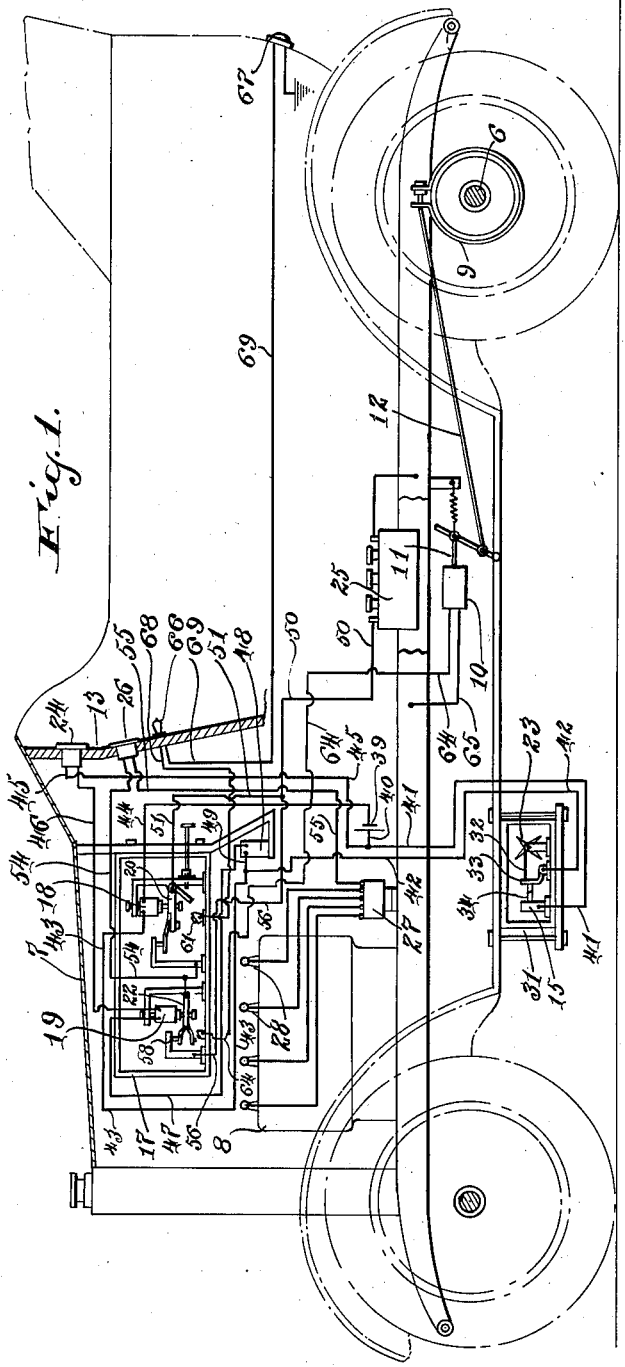
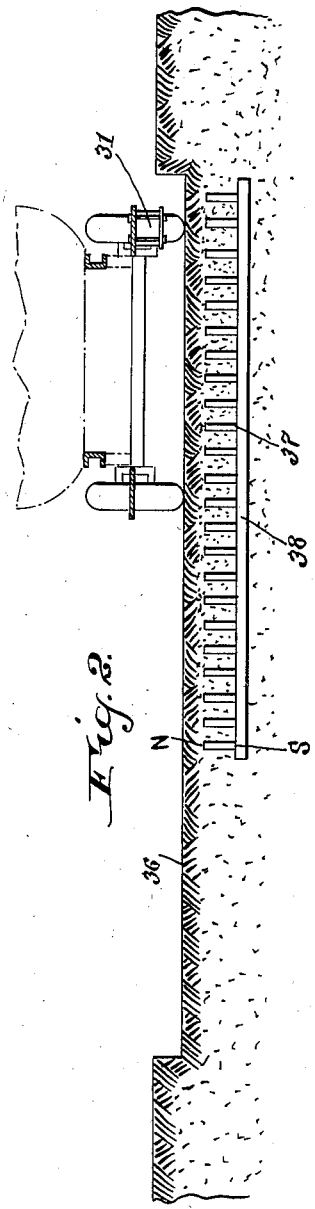
INVENTOR.
Charles Adler Jr.
BY
Charles B. Mann Jr.
ATTORNEY.

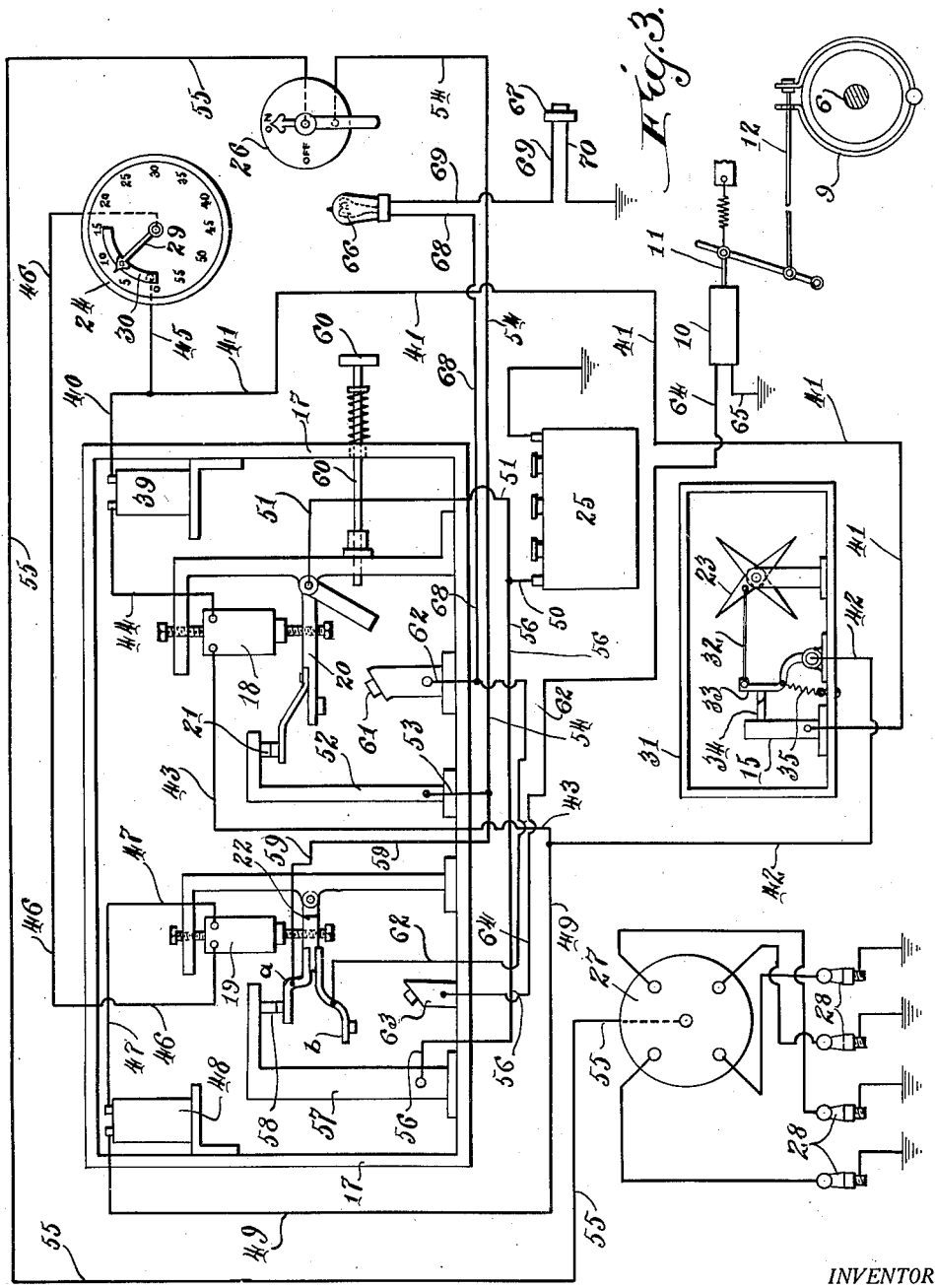

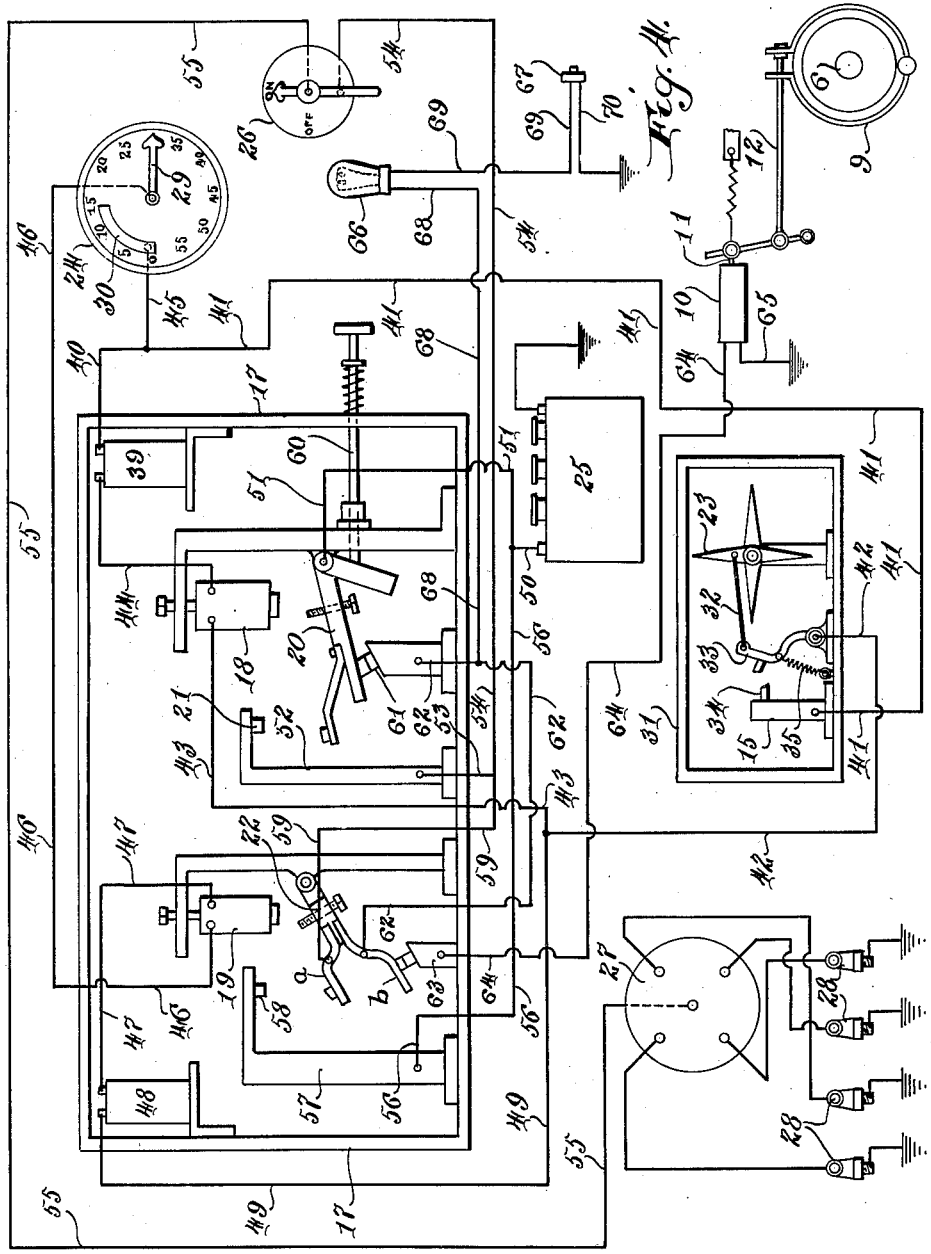

Patented Apr. 28, 1931

1,803,288

UNITED STATES PATENT OFFICE

CHARLES ADLER, JR., OF BALTIMORE, MARYLAND, ASSIGNOR TO THE ADLER SAFETY CONTROL COMPANY, OF BALTIMORE, MARYLAND, A CORPORATION OF MARYLAND

AUTOMATIC SPEED-CONTROL MECHANISM FOR AUTOMOBILES

Application filed July 23, 1926. Serial No. 124,347.

This invention relates to an automatic mechanism for controlling the speed of automobiles on trackless highways.

The object of the invention is to provide an automobile with a mechanism that may automatically be actuated by a mechanism located at dangerous places on a highway whereby to cause an automatic reduction in the speed of an automobile if the speed of the latter is greater than a prescribed or predetermined speed during the passage of said automobile at said place of danger.

The present invention involves the power means for driving the automobile together with a speed governor and a means also on the vehicle which is to be operated by a magnetic means arranged on the highway whereby to cut off the power and automatically reduce the speed until a predetermined reduced speed of the automobile shall have been effected and to then permit the automobile to proceed at or below such reduced speed.

The present invention is an improvement on or modification of the apparatus disclosed in my pending application for patent, Serial No. 23,528, filed in the Patent Office April 16th 1925, and differs from the latter in the form of apparatus and circuits carried on the vehicle as well as in the roadway magnetic means.

The present invention includes a magnetic element on the vehicle which is actuated by devices on the trackless highway, and the effects of such actuation are determined by a speed-operated device or governor so that when such actuation takes place the power means on the vehicle will be cut off if the vehicle is exceeding a predetermined speed or will continue effective if the speed is at or below such predetermined speed.

In the present invention I also make use of devices and circuits not disclosed in my prior application.

The invention is diagrammatically illustrated in the accompanying drawings, wherein,—

Fig. 1 shows an outline of an automobile and diagrammatically illustrates an arrangement of the elements and circuits thereon for carrying out the present inventive idea.

Fig. 2 illustrates a cross-sectional detail through a highway with my highway device embedded therein and also shows an automobile on the highway over the magnetic device.

Fig. 3 shows diagrammatically the apparatus located on the automobile together with the normal circuit connections for operating the same, and Fig. 4 illustrates the circuits and the apparatus on the vehicle when the device is automatically operated to cut off the power means.

In the present illustration of the invention the numeral 6 designates the rear axle of an automobile; 7 the hood under which the engine 8 is located and 9 designates a brake device on the rear wheels.

In the present instance, it is presumed that the brake on the automobile is designed to be operated electrically by a solenoid 10 through rod and lever connections 11 and 12 so that the closing of a circuit through the said solenoid will actuate the brake device.

In the present disclosure the solenoid-actuated brake will be operated to check the speed of the automobile but will be released when the speed has been reduced, as will presently be explained.

In further carrying out the present invention, I provide devices that will automatically control the power means on the automobile, without however interfering with the normal and proper operations at the will of the driver, except at dangerous places, where the speed of the automobile should be reduced.

One means, under the present invention, to effect this automatic control of the automobile is illustrated in the present application but it is to be understood that the invention in no way is limited or restricted to the means herein disclosed.

In the drawing, I show a casing 17, which may be mounted at any convenient place on the automobile, but in this instance inaccessible to the driver while the latter is on the driver's seat, and at present shown as carried under the hood and at the forward side of the dash or instrument-board 13 of the automobile.

In this casing, which may have a glass window for inspecting the mechanism on the interior, I mount two electro-magnets 18 and 19 respectively, as clearly shown in Figs. 3 and 4 of the drawings.

The magnet 18 has an armature 20 which normally engages a front contact 21, when the armature is held up by the magnet, while the magnet 19 controls an armature 22 which latter has electrically-separated front and back contacts a and b and said armature is controlled according to the speed of the vehicle, as will presently be fully explained.

In addition to the two electro-magnets 18 and 19 and their armatures 20 and 22, I make use of a magnetized element such for example as a magnetic needle-bar 23, which is so arranged that it will be operated at dangerous places on the highway by a highway mechanism hereinafter explained, so as to interrupt current through the electro-magnet 18 whenever the automobile enters a dangerous zone at a speed above a predetermined low speed.

I further employ on the automobile a speed governor 24 which latter is aranged so that when the speed is at or below a predetermined low speed, a circuit will be maintained through the electro-magnet 19 and hold its armature 22 up in order to maintain a circuit through the front contact, a, that will enable the power means on the automobile to keep on functioning irrespective of the operations of the magnetic needle-bar 23.

The automobile is provided with the usual battery 25 and also with the usual mechanisms such as ignition switch 26, distributor 27 and the intermediate devices to produce the proper spark at the spark-plugs 28 of the motor.

The speed governor 24 may also if desired be the speedometer, and in this instance it makes use of a movable contact element 29, in the form of an indicator hand and a segment plate 30 as a stationary contact element so that when the hand indicates speeds say from zero to fifteen miles per hour it and the contact plate 30 will be in engagement while above fifteen miles per hour the said hand and contact plate will be out of engagement.

I have herein refered to a power means in connection with the motor and to a means for controlling the same. By this latter I mean any element of the motor or coacting therewith will cut off the power. For example, if the ignition be interrupted so as to stop the spark at the plugs there will obviously be no power until that ignition is restored, but the power may be cut off in other ways and the invention is to be construed with this in mind.

In the present instance the magnetically-operated element has the form of double or crossed needles 23 and is mounted to oscillate in a case 31 which in the present instance is presumed to be attached to the under side of the running-board of the automobile on the right hand side of the car.

This needle-bar is mounted on a horizontal axis so it may swing or rock in a vertical plane and attached to the bar is a link or other connection 32, which latter connects the needle-bar with a movable switch-element 33. This movable switch element 33 normally engages a contact 34 on a post 15 in the case 31 and may be aided in that engagement by means of an adjustable spring 35.

It is believed to be clear that if the needle-bar 23 is actuated by being swung or rocked by the attraction of unlike poles of the highway energy means, the oscillating movement of such needle bar will actuate the link 32 and draw the switch-element 33 from engagement with contact 34, thus opening a circuit at such point.

A form of highway mechanism is illustrated in Fig. 2 of the drawing and in connection therewith it is to be understood that the highway devices are located at dangerous places along the highway, such as at dangerous curves, cross-roads, railway crossings, entrances to hamlets or villages and in similar places where the speed of the automobile should be reduced, and it should also be understood that the highway installation at one dangerous point has no mechanical or electrical connection with a similar installation at any other point and that each highway device is entirely separate and independent of all other highway devices.

It is customary and a well-known rule that all vehicles keep to the right of a highway and this rule is so well obeyed by drivers that in the present disclosure, I recognize and take advantage of this rule of the road in locating the highway actuating means.

In Fig. 2 of the drawing, I show a cross-sectional detail through the highway and by reference thereto, it will be noted that beneath the surface 36 of the highway, I provide a magnet structure 37 mounted on a base 38 and extending crosswise of the highway for a distance greater than one-half the width of the road. The purpose of thus extending the magnet structure for a distance greater than one-half the width of the highway is to prevent the automobile driver from detouring or driving around the end of the magnet means by driving on the left hand side of the road.

This is further avoided by locating the vehicle coacting device 23 on the right hand side of the automobile so that in order to escape the effect of the highway device the right hand side of the automobile must be well over on the left hand side of the road and beyond the left hand end of the highway magnet.

In the present instance the highway magnet structure is buried beneath the surface 36 of the highway.

In its present form the magnet is shown as of the permanent magnet variety, like poles all being uppermost and the other like poles being at the base.

The poles of the needle-bar actuator 23 on the vehicle are arranged so as to be attracted by the uppermost poles of the highway magnet as the automobile passes over the highway magnet, so that as each highway device is passed the needle-bar 23 will be actuated to momentarily open or separate the contacts 33—34 on the automobile and thereby effect an operation on the vehicle that will automatically cause a reduction in the vehicle speed, if when that operation takes place the speed is above a predetermined speed, say of over fifteen miles per hour.

The operation is brought about by means and circuits which will now be explained.

By reference to Fig. 3, it will be noted that both relays 18 and 19 are shown as energized; that the speed switch 29—30 is closed because the speed is fifteen miles or under per hour, and that the needle-bar actuator 23 and its switch 33—34 are closed.

The circuit for normally maintaining the electro-magnet 18, which is the reset magnet, includes the battery 39; wires 40—41; post 15 of needle-bar actuator; contacts 34—33 of said actuator; wires 42—43 to relay 18, and wire 44 back to battery 39. This circuit through the reset magnet or relay 18, will be maintained, regardless of the speed switch 29—30, as long as needle-bar contacts 34—33 are kept closed, but when the vehicle reaches a highway magnet 37 the needle-bar actuator 23 will be attracted by such highway magnet and the contacts 34—33 will be momentarily opened.

This momentary opening of the contacts 34—33 would cause relay 18 to become de-energized every time contacts 34—33 open, unless some means be provided to prevent such deenergization, and every time that relay 18 is deenergized the power means is to be cut off by, in this instance, interrupting or breaking the ignition circuit to the distributor and spark-plugs.

As, in accordance with this invention, it is proposed to only interrupt or cut off the power means when the speed is excessive at the time magnetic needle contacts 34—33 are operated, it apparently becomes necessary to provide a substitute circuit for the relay 18, if the speed is below a predetermined low speed.

This substitute circuit for relay 18, at low or safe speed is as follows:

When the automobile speed is at or below the predetermined low speed the contacts 29—30 of the speed switch or governor 24 will be closed and the substitute circuit for relay 18 includes that speed switch.

This substitute circuit therefore starting with relay 18 includes wire 44, battery 39; wires 40 and 45 to speed switch contacts 30 and 29; wire 46 to and through magnet 19; wire 47 to and through battery 48, and wires 49 and 43 back to relay 18.

This substitute circuit for relay 18 will therefore be effective provided the speed-switch contacts 30—29 are closed and the speed is at or below the predetermined safe speed, say of fifteen miles per hour, and even though the needle-bar contacts 34—33 are opened as a highway device is passed the power means will not be cut off or interrupted if the speed is safe at the time the needle-bar is actuated.

The ignition circuit is normally maintained through the relay 18 when the speed of the automobile is above the predetermined low speed as follows.

From main battery 25 by wires 50 and 51 to and through armature 20 and contact 21 of the relay 18; then through post 52, wires 53 and 54 to and through the ordinary ignition switch 26 on the automobile; then by wires 55 to and through the distributor 27 and spark plugs 28 and return by ground to the main battery 25.

The maintainance of this normal ignition circuit therefore includes armature 20 of relay 18 and said relay must therefore be energized.

It is therefore to be understood that the ignition circuit or the power means on the automobile will be maintained through relay 18 plus needle bar contacts 34—33 no matter what the speed may be as long as no highway actuating means is passed to interrupt or actuate the needle-bar contacts, but that when a highway device is passed the speed must have been reduced to the predetermined low or safe speed, at which time the relay 18 will be maintained by a substitute circuit through the speed switch contacts 30—29; so that when the needle-bar contacts 34—33 are opened the substitute circuit will have been formed.

It will now be presumed that the automobile is traveling at an excessive speed, or at a speed above the predetermined low speed of fifteen miles per hour, at the time a highway device 37 is passed and the conditions of the apparatus will then be as shown in Fig. 4 of the drawing wherein both relays 18—19 are deenergized; the speed switch contacts 30—29 are open and the needle-bar contacts 34—33 are also open.

Under these conditions, the ignition circuit or power means will be cut off because current from the main battery 25 cannot pass through armature 20 to contact 21 thence to ignition switch 26, nor can current pass from said main battery 25 through the front contact of armature 22 of relay 19 and then to the ignition switch 26 because relay 19 is deenergized and its armature has dropped and its back contact, b, has a connection only with the brake mechanism. Neither can relay 18 pick up its armature 20, when the needle-bar contacts 34—33 close, as the latter do immediately after passing the highway device, because the gap between the relay 18 and armature 20 is too great to effect this pick-up although the substitute circuit through relay 18 from battery 39 will be closed as needle-bar contacts 34—33 close.

Therefore when both relays 18—19 become deenergized by the opening of needle-bar contacts 34—33 while the speed switch contacts 30—29 are disengaged, the power means or the ignition circuit will be entirely cut off until the speed of the vehicle is reduced to the predetermined safe speed and when the speed has thus been reduced, the speed-switch contacts 30—29 close and by closing accomplishes two things, to wit:

It first causes relay 19 to become energized and secondly,—it enables a low-speed ignition circuit to be formed which low speed circuit will only be closed so long as the speed of the automobile is kept below the predetermined low-speed limit.

The circuit for thus energizing the speed relay 19 when the automobile speed is reduced is therefore as follows:—

From relay 19 by wire 47 to battery 48; then by wires 49 and 42 to and through the needle-bar contacts 34—33 which are closed; then by post 15, wires 41 and 45 to speed contacts 30 and 29, which latter have also closed because the speed has been reduced, then by wire 46 back to the relay 19 thus completing a circuit through the relay 19 from battery 48.

A circuit would also be completed through relay 19 from battery 48; by wire 47, battery 48, wires 49 and 43 through relay 18 (although armature 20 of relay 18 is still down) then by wire 44, battery 39, wires 40 and 45 to and through speed switch contacts 30 and 29, then by wire 46 back to relay 19.

Having thus energized relay 19 and picked up the armature 22, although armature 20 of relay 18 is still down, a low speed ignition circuit will be formed from the main battery 25 to the distributor as follows:

From battery 25 by wires 50 and 56 to post 57 of speed relay then through contact 58 to front point a, of armature 22, then by wires 59 and 54 to the ignition switch 26 and then by wire 55 to the distributor 27, thus providing a circuit for ignition purposes only so long however as relay 19 is kept energized by the speed switch contacts 30 29 engaging, because it should be borne in mind that armature 20 of relay 18 has been down since that relay was deenergized.

The speed therefore of the automobile cannot exceed the low speed limit as long as armature 20 is down because the moment the speed switch contacts 30—29 disengage as the speed is increased the speed relay again becomes deenergized and by dropping armature 22 and its front contact, a, again cuts off or interrupts the ignition circuit.

It will thus be noted that when the automatic interruption of the ignition circuit takes place the power is cut off until the speed is reduced to a safe low speed, then the low speed ignition circuit is formed and this will continue until the armature 20 of relay 18 is reset, but this resetting is to be accomplished manually by the driver who must stop his automobile and then reset armature 20, in this instance by pressing the reset bar 60 which will lift the armature until the magnet 18 can pick it up and hold it.

It will thus be seen that the driver is not rendered helpless because after the power is cut off and the speed of his automobile is reduced, the power is again restored when the speed has been reduced and the automobile has not been brought to a standstill but may be driven at the low speed until the driver takes the time to reset the armature 20.

Thus the automobile will not be stalled at a dangerous place but will simply have its speed cut down automatically.

When the ignition circuit is automatically interrupted by the dropping of armature 20 said armature when dropping, closes a circuit through a back contact 61 and thereby effects a plurality of operations.

For example, when the armature 20 engages back contact 61, it may close a circuit through the solenoid brake device 10 by completing a circuit from the main battery 25 by wires 50 and 51 to and through the armature 20 back contact 61 as shown in Fig. 4, then by wire 62 to back contact, b, of armature 22 of relay 19; then by post 63 and wire 64 to solenoid 10 to actuate the brake rods, and from the solenoid by wire 65 to ground and back to battery.

The closing of this same back contact circuit may also be utilized to operate signals such as the lamp 66 and a lamp, horn or bell 67, both of which are connected by a wire 68 from wire 62, and by wires 69 and a ground wire 70.

Thus when the automatic cut off of the power takes place, the brakes may be applied and visual and audible signals be given.

When the ignition circuit is interrupted because of excessive speed at a dangerous place in the highway, the brake is applied because both relays 18 and 19 are deenergized and armature 20 is in engagement with back contact 61 while back contact, b, of armature 22 of relay 19 is in engagement with post 63.

Obviously when the ignition is cut off and the brakes are applied, the speed of the automobile will be reduced and when it drops to the predetermined low speed, say of fifteen miles per hour, then the speed contacts 30, 29 close and relay 19 will become energized and pick up its armature 22, thus opening the solenoid circuit at back contact, *b*, and post 63 whereupon the brakes will release.

Thus it will be seen that the brakes will be applied when the ignition is interrupted but will be released again when the ignition is restored and the speed has been reduced.

Having described my invention, I claim:—

1. In an automobile, a circuit controller supported on the automobile so as to be directly and effectively operated by a permanent magnet located in a roadway, and an alarm circuit interrupted by said controller.

2. In an automobile control system, a permanent magnet located on a roadway, and an automobile having an alarm actuated by said permanent magnet.

3. In an automobile, a circuit controller including a member of magnetic material supported on the automobile so as to receive the flux from a permanent magnet located on a roadway, an ignition circuit opened by said controller and an alarm also actuated by said controller.

4. In a vehicle control system, a permanent magnet located in a roadway, said permanent magnet being located longitudinally substantially at right angles to the longitudinal direction of said roadway, and a vehicle having an ignition circuit interrupted by said permanent magnet.

In testimony whereof I affix my signature.

CHARLES ADLER, Jr.